US 8,549,518 B1

(12) United States Patent
Aron et al.

(10) Patent No.: US 8,549,518 B1
(45) Date of Patent: Oct. 1, 2013

(54) METHOD AND SYSTEM FOR IMPLEMENTING A MAINTENANECE SERVICE FOR MANAGING I/O AND STORAGE FOR VIRTUALIZATION ENVIRONMENT

(75) Inventors: Mohit Aron, Los Altos, CA (US); Brent Chun, Monrovia, CA (US); Chaitanya Venkata Krishna Bayapuneni, Santa Clara, CA (US)

(73) Assignee: Nutanix, Inc., San Jose, CA (US)

(*) Notice: Subject to any disclaimer, the term of this patent is extended or adjusted under 35 U.S.C. 154(b) by 0 days.

(21) Appl. No.: 13/207,365

(22) Filed: Aug. 10, 2011

(51) Int. Cl.
G06F 9/455 (2006.01)

(52) U.S. Cl.
USPC .................................................. 718/1

(58) Field of Classification Search
None
See application file for complete search history.

(56) References Cited

U.S. PATENT DOCUMENTS

| | | | |
|---|---|---|---|
| 6,834,386 B1* | 12/2004 | Douceur et al. | 718/107 |
| 7,035,881 B2 | 4/2006 | Tummala et al. | |
| 8,099,572 B1 | 1/2012 | Arora et al. | |
| 8,194,674 B1 | 6/2012 | Pagel et al. | |
| 2003/0046369 A1* | 3/2003 | Sim et al. | 709/220 |
| 2004/0139128 A1 | 7/2004 | Becker et al. | |
| 2005/0065985 A1 | 3/2005 | Tummala et al. | |
| 2005/0102672 A1* | 5/2005 | Brothers | 718/1 |
| 2006/0123062 A1* | 6/2006 | Bobbitt et al. | 707/200 |
| 2007/0156955 A1 | 7/2007 | Royer, Jr. et al. | |
| 2008/0183973 A1 | 7/2008 | Aguilera et al. | |
| 2008/0244028 A1 | 10/2008 | Le et al. | |
| 2008/0263407 A1 | 10/2008 | Yamamoto | |
| 2008/0282047 A1 | 11/2008 | Arakawa et al. | |
| 2009/0222542 A1 | 9/2009 | Miyajima | |
| 2009/0259759 A1 | 10/2009 | Miyajima | |
| 2010/0037243 A1 | 2/2010 | Mo et al. | |
| 2010/0070470 A1 | 3/2010 | Milencovici et al. | |
| 2010/0162039 A1 | 6/2010 | Goroff et al. | |
| 2010/0251238 A1 | 9/2010 | Schuba et al. | |
| 2010/0281166 A1* | 11/2010 | Buyya et al. | 709/226 |
| 2011/0061050 A1 | 3/2011 | Sahita et al. | |
| 2011/0071983 A1 | 3/2011 | Murase | |
| 2011/0145916 A1 | 6/2011 | Mckenzie et al. | |
| 2011/0154318 A1 | 6/2011 | Oshins et al. | |
| 2011/0208909 A1 | 8/2011 | Kawaguchi | |
| 2011/0258404 A1 | 10/2011 | Arakawa et al. | |
| 2012/0005307 A1* | 1/2012 | Das et al. | 709/219 |
| 2012/0030676 A1 | 2/2012 | Smith et al. | |
| 2012/0079229 A1* | 3/2012 | Jensen et al. | 711/170 |
| 2012/0096461 A1 | 4/2012 | Goswami et al. | |
| 2012/0144229 A1 | 6/2012 | Nadolski | |
| 2012/0272240 A1 | 10/2012 | Starks et al. | |

OTHER PUBLICATIONS

Non-final Office Action dated Jan. 24, 2013 for U.S. Appl. No. 13/207,371.

(Continued)

*Primary Examiner* — Gregory A Kessler
(74) *Attorney, Agent, or Firm* — Vista IP Law Group, LLP

(57) ABSTRACT

Disclosed is an approach for overseeing the overall state of a virtual storage system, and for taking actions as necessary to manage the health and efficient performance of that system. A curator entity is provided on a distributed basis to manage and perform these functions. A master curator manages this workload that is performed by multiple slave curators. MapReduce operations are performed to implement the curator workload. Periodically, the master curator coordinates a full scan of all the metadata in the system using three MapReduce operations. Partial scans may also be run using a single MapReduce operation.

43 Claims, 9 Drawing Sheets

(56) References Cited

OTHER PUBLICATIONS

Thekkath et al., "Frangipani: A Scalable Distributed File System", SOSP, 1997, 24 pages.
Mendel Rosenblum, "The Design and Implementation of a Log-structured File System", SOSP, 1991, 101 pages.
Birrell et al., "A Simple and Efficient Implementation for Small Databases", Aug. 11, 1987, 17 pages.
Terry et al., "Managing Update Conflicts in Bayou, a Weakly Connected Replicated Storage System", Association for Computing Machinery, 1995, 12 pages.
Mike Burrows, "The Chubby lock service for loosely-coupled distributed systems", OSDI 2006 Paper, Google Inc., Sep. 6, 2006, 23 pages.
Lee et al., "Petal: Distributed Virtual Disks" The Proceedings of the 7th International Conference on Architectural Support for Programming Languages and Operating Systems, 1996, 9 pages.
Dean et al., "MapReduce: Simplified Data Processing on Large Clusters", OSDI 2004, 6th Symposium on Operating Systems Design and Implementation, Google Inc, Oct. 3, 2004, 25 pages.
Chang et al., "Bigtable: A Distributed Storage System for Structured Data" OSDI 2006 Paper, 7th USENIX Symposium on Operating Systems Design and Implementation, 2006, 20 pages.
Ghemawat et al., "The Google File System", SOSP 2003, ACM, Bolton Landing, NY, 2003, 15 pages.
Zhu et al., "Avoiding the Disk Bottleneck in the Data Domain Deduplication File System", Data Domain, Inc., 2008, 15 pages.
DeCandia et al., "Dynamo: Amazon's Highly Available Key-value Store", Proceedings of the 21st ACM Symposium on Operating Systems Principles, Oct. 2007, 16 pages.
Project Voldemort, A distributed database, Jan. 9, 2013 url: http://www.project-voldemort.com/voldemort/.
Bernstein et al., "Concurrency Control and Recovery in Database Systems", Addison-Wesley 1987, 35 pages.
Weikum et al., "Transactional Information Systems: Theory, Algorithms, and the Practice of Concurrency Control and Recovery", 2002, 91 pages.
Timothy L. Harris, "A Pragmatic Implementation of Non-Blocking Linked-Lists", 2001, 15 pages.
Lakshman et al., "Cassandra—A Decentralized Structured Storage System", LADIS, 2009, 6 pages.
"Open iSCSI", Project: Open-iSCSI—RFC3720 architecture and implementation, 2005 url: http://www.open-iscsi.org.
"Chunkfs", Aug. 22, 2009url: http://valerieaurora.org/chunkfs/.
"Hypertable", Hypertable Inc., Oct. 28, 2012 url: http://hypertable.org/.
MacCormick et al., "Boxwood: Abstractions as the Foundation for Storage Infrastructure" OSDI 2004, Microsoft Research Silicon Valley, 31 pages.
Robert Hagmann, "Reimplementing the Cedar File System Using Logging and Group Commit", ACM, 1987, 8 pages.
Sherman et al., "ACMS: The Akamai Configuration Management System" NSDI, 2005, 22 pages.
Petersen et al., "Flexible Update Propagation for Weakly Consistent Replication", SOSP, 1997, 19 pages.
Banga et al., "Resource containers: A new facility for resource management in server systems" Proceedings of the 3rd USENIX Symposium on ODSI, 1999, 15 pages.
F. Mattern, "Virtual Time and Global States of Distributed Systems" Proceedings of the International Workshop on Parallel and Distributed Algorithms, 1989, 15 pages.
Maged M. Michael, "High Performance Dynamic Lock-Free Hash List-Based Sets" SPAA 2002, Aug. 2002, 10 pages.
Welsh et al., "SEDA: An Architecture for Well-Conditioned, Scalable Internet Services" Proceedings of the Eighteenth Symposium on Operating Systems Principles, Oct. 2001, 15 pages.
Non-final Office Action dated Apr. 11, 2013 for U.S. Appl. No. 13/207,345.
Final Office Action dated Jun. 27, 2013 for U.S. Appl. No. 13/207,371.

* cited by examiner

METHOD AND SYSTEM FOR IMPLEMENTING A MAINTENANECE SERVICE FOR MANAGING I/O AND STORAGE FOR VIRTUALIZATION ENVIRONMENT

CROSS REFERENCE TO RELATED APPLICATIONS

The present application is related to application Ser. No. 13/207,345, entitled "ARCHITECTURE FOR MANAGING I/O AND STORAGE FOR A VIRTUALIZATION ENVIRONMENT", application Ser. No. 13/207,357 entitled "METADATA FOR MANAGING I/O AND STORAGE FOR A VIRTUALIZATION ENVIRONMENT", application Ser. No. 13/207,371 entitled "METHOD AND SYSTEM FOR IMPLEMENTING WRITABLE SNAPSHOTS IN A VIRTUALIZATION STORAGE ENVIRONMENT", and application Ser. No. 13/207,375, entitled "METHOD AND SYSTEM FOR IMPLEMENTING A FAST CONVOLUTION FOR COMPUTING APPLICATIONS", all filed on even date herewith, and which are all hereby incorporated by reference in their entirety.

FIELD

This invention concerns a mechanism for managing I/O and storage devices in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are typically architected as diskless computers ("application servers") talking to a set of networked storage appliances ("storage servers") via a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems. Either way, a volume is the smallest unit of administration for a storage device, e.g., a storage administrator can set policies to backup, snapshot, RAID-protect, or WAN-replicate a volume, but cannot do the same operations on a region of the LUN, or on a specific file in a file system.

Storage devices comprise one type of physical resources that can be managed and utilized in a virtualization environment. For example, VMWare is a company that provides products to implement virtualization, in which networked storage devices are managed by the VMWare virtualization software to provide the underlying storage infrastructure for the VMs in the computing environment. The VMWare approach implements a file system (VMFS) that exposes emulated storage hardware to the VMs. The VMWare approach uses VMDK "files" to represent virtual disks that can be accessed by the VMs in the system. Effectively, a single volume can be accessed and shared among multiple VMs.

While this known approach does allow multiple VMs to perform I/O activities upon shared networked storage, there are also numerous drawbacks and inefficiencies with this approach. For example, the VMWare approach only allows access to networked storage, and does not have the ability to use direct attached storage as part of a shared storage architecture. While the virtualization administrator needs to manage VMs, the storage administrator is forced to manage coarse-grained volumes that are shared by multiple VMs. Configurations such as backup and snapshot frequencies, RAID properties, replication policies, performance and reliability guarantees etc. continue to be at a volume level, and that is problematic. Moreover, this conventional approach does not allow for certain storage-related optimizations to occur in the primary storage path.

Related application Ser. No. 13/207,345 describes an improved architecture for managing I/O and storage devices in a virtualization environment. The approach of application Ser. No. 13/207,345 provides for specially configured virtual machines (referred to as "Service VMs") to control and manage any type of storage device, including directly attached storage in addition to networked and cloud storage. The Service VM implements a storage controller in the user space, and can virtualizes I/O access to storage hardware. IP-based requests are used to send I/O request to the Service VMs. The Service VM can directly implement storage and I/O optimizations within the direct data access path, without the need for add-on products. Related application Ser. No. 13/207,357 describes an approach for using advanced metadata to implement the architecture for managing I/O operations and storage devices for a virtualization environment. The advanced metadata is used to track data across the storage devices. A lock-free approach is implemented in some embodiments to access and modify the metadata.

The problem addressed by the present application is that certain maintenance and optimization tasks should be performed to manage the operations of a virtual storage system. For example, garbage collection tasks should be performed when using advanced metadata techniques as described in the related application Ser. No. 13/207,357. However, conventional technologies do not provide efficient or scalable solutions to these maintenance and optimization requirements.

SUMMARY

Embodiments of the present invention provide an approach for overseeing the overall state of a virtual storage system, and for taking actions as necessary to manage the health and efficient performance of that system. According to some embodiments of the invention, a "curator" entity is provided on a distributed basis to manage and perform these functions. A master curator manages this workload that is performed by multiple slave curators. MapReduce operations are performed to implement the curator workload. Periodically, the master curator may coordinate a full scan of all the metadata in the system using three MapReduce operations. Partial scans may also be run using a single MapReduce operation.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Embodiments of the present invention provide an approach for overseeing the overall state of a virtual storage system, and for taking actions as necessary to manage the health and efficient performance of that system. According to some embodiments of the invention, a "curator" entity is provided on a distributed basis to manage and perform these functions. A master curator manages this workload that is performed by multiple slave curators. MapReduce operations are performed to implement the curator workload. Periodically, the master curator coordinates a full scan of all the metadata in the system using three MapReduce operations. Partial scans may also be run using a single MapReduce operation. In the process of running these MapReduce operations, certain actions may need to be performed. Some of these actions can be performed quickly and run by the Curator immediately. Others may take a longer time (e.g., replicating or migrating an extent group) and are performed in the background outside the context of the MapReduce. Appropriate flow control is used. For example, if too many replications need to be done, then only a limited number of those are executed at any given time. The Curator ensures that all background actions are eventually executed.

Figure 1:
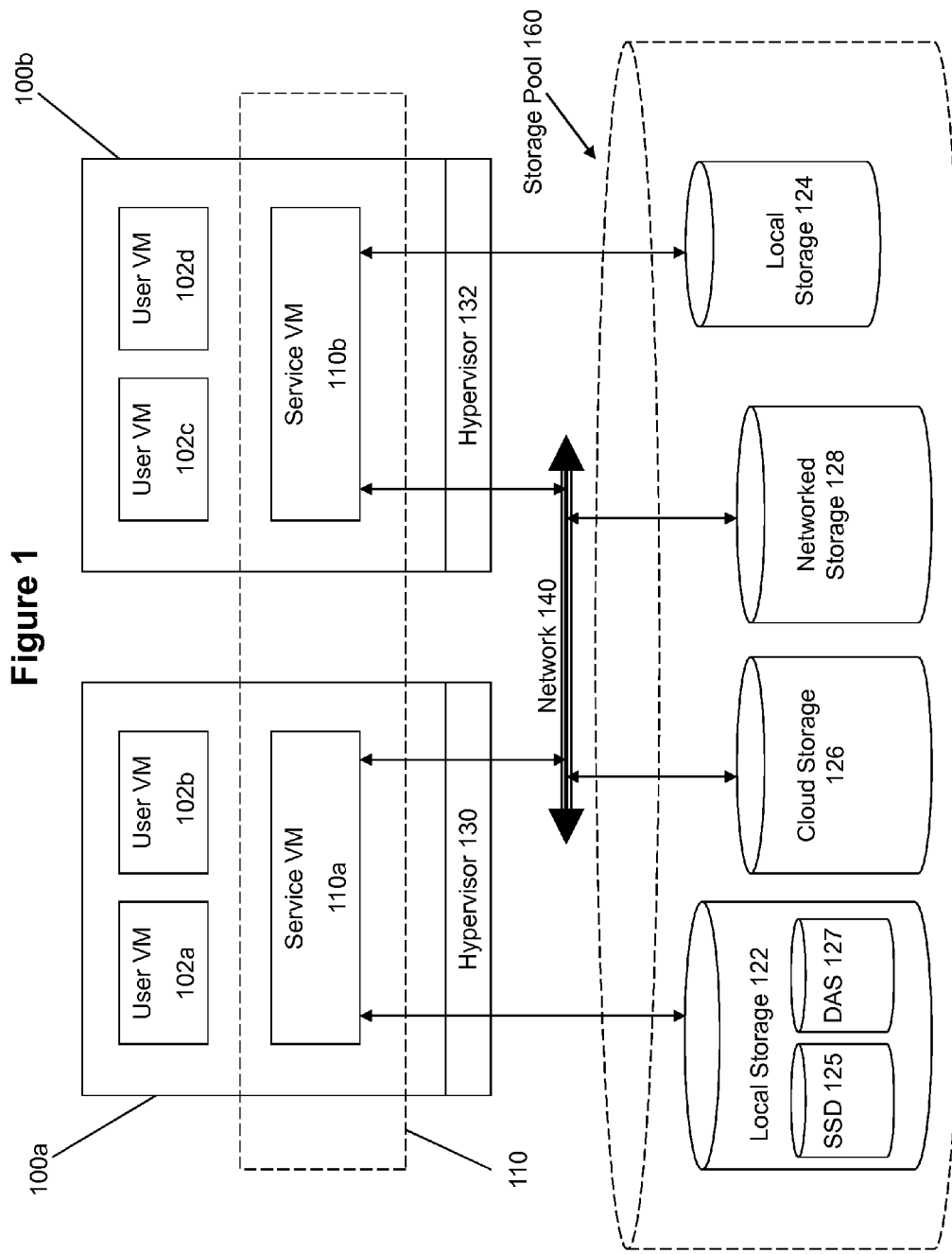
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. Like the prior art, the multiple tiers of storage includes storage that is accessible through a network 140, such as cloud storage 126 or networked storage 128 (e.g., a SAN or "storage area network"). Unlike the prior art, the present embodiment also permits management of local storage 122/124 that is within or directly attached to the server and/or appliance. Examples of such storage include SSDs 125 ("solid state drives") or HDDs 127 ("hard disk drives"). These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as the ESX product available from VMWare. The virtualization software includes a hypervisor 130/132 to manage the interactions between the underlying hardware and the one or more user VMs 102a, 102b, 102c, and 102d that run client software. The virtualization software may also include host operating systems components.

A special VM 110a/110b is used to manage storage and I/O activities according to some embodiment of the invention, which is referred to herein as a "Service VM". The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations According to some embodiments, the service VM runs the Linux operating system. As noted above, since the service VM exports a block-device or file-access interface to the user VMs, the interaction between the user VMs and the service VMs follows the iSCSI or NFS protocol, either directly or indirectly via the hypervisor's hardware emulation layer.

For easy management of the appliance, the Service VMs all have the same IP address isolated by internal VLANs (virtual LANs in the virtual switch of the hypervisor). The Service VM on a node will implement two virtual network interface cards (NICs). One of the virtual NICs corresponds to an internal VLAN that permits the User VM to communicate with the Service VM using the common IP address. The virtual switch would therefore route all communications internal to the node between the User VM and the Service VM using the first virtual NIC, where the common IP address is managed to correspond to the Service VM due to its membership in the appropriate VLAN. The second virtual NIC is used to communicate with entities external to the node, where the second virtual NIC is associated with an IP address that would be specific to Service VM (and no other service VM). The second virtual NIC is therefore used to allow Service VM to communicate with other service VMs.

Figure 2:
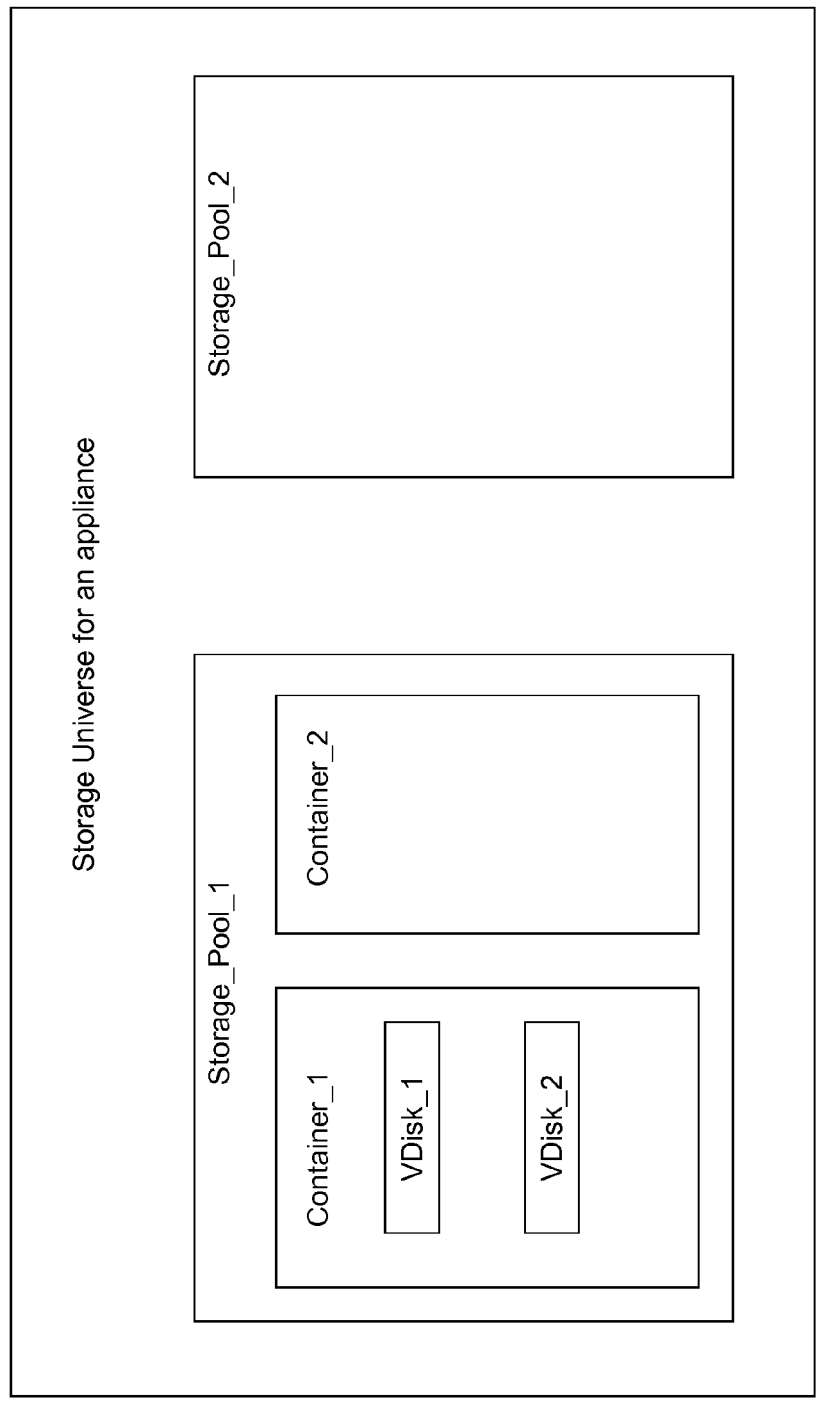
FIG. 2 illustrates a storage hierarchy according to some embodiments of the invention.

For easy management of the appliance, the storage is divided up into abstractions that have a hierarchical relationship to each other. FIG. 2 illustrates the storage hierarchy of the storage objects according to some embodiments of the invention, where all storage in the storage appliance collectively forms a Storage Universe. These storage devices may encompass any suitable devices, such as SSDs or HDDs on the various servers (server-internal or local storage), SAN, and Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to make just one storage pool with all the disks in the storage universe in that pool. However, the principal idea behind dividing up the storage universe is to provide mutual exclusion—fault isolation, performance isolation, administrative autonomy—when accessing the disk resources.

This may be one approach that can be taken to implement QoS techniques. For example, one rogue user may result in lots of random IO activity on a hard disk—thus if other users are doing sequential IO, they still might get hurt by the rogue user. Enforcing exclusion (isolation) through storage pools might be used to provide hard guarantees for premium users. Another reason to use a storage pool might be to reserve some disks for later use ("Field Replaceable Units" or FRUs).

In some embodiments, the container abstraction specifies a de-duplication domain. That is, all de-duplication is done for data stored within a container. Data in different containers is not de-duplicated even if it is the same. A container is assigned one or more storage pools—this defines the disks where the data for that container will be stored. A container supports several configuration parameters that determine how the data on that container is treated, including some or all of the following:

1. Replication factor: data in a container is replicated based on this replication factor. Replicas are placed on different servers whenever possible.
2. Reed Solomon parameters: While data is written initially based on the specified replication factor, it may be converted later to use Reed Solomon encoding to further save on storage capacity. The data contraction policy on the vDisks enforces when the data is converted to use Reed Solomon encoding. It is noted that there are also other encoding schemes which can be utilized as well.
3. Encryption type: Data in a container is encrypted based on the specified encryption policy if any.

4. Compression type: Data in a container is compressed based on the given compression type. However, when to compress is a policy that's specified on individual vDisks assigned to a container. That is, compression may be done inline, or it may be done offline.
5. Max capacity: This parameter specifies the max total disk capacity to be used in each tier in the assigned storage pools.
6. Min reserved capacity (specified for each tier): This parameter can also be specified for each tier in the assigned storage pools. It reserves a certain amount of disk space on each tier for this container. This ensures that that disk space would be available for use for this container irrespective of the usage by other containers.
7. Min total reserved capacity: This is the minimum reserved across all tiers. This value should be greater than or equal to the sum of the min reserved capacity per tier values.
8. Max de-duplication extent size: The Rabin fingerprinting algorithm breaks up a contiguous space of data into variable sized extents for the purpose of de-duplication. This parameter determines the max size of such extents.
9. Stripe width: To get high disk bandwidth, it is important to stripe data over several disks. The stripe width dictates the number of extents corresponding to a contiguous vDisk address space that'll be put in a single extent group.
10. Tier ordering: All tiers in the assigned storage pools are ordered relative to each other. Hot data is placed in the tier highest up in the order and migrated to other tiers later based on the ILM (Information Lifecycle Management or "data waterfalling") policy. A different tier ordering may be specified for random JO as opposed to sequential JO. Thus, one may want to migrate data to the SSD tier only for random JO and not for sequential JO.
11. ILM policy: The ILM policy dictates when data is migrated from one tier to the tier next in the tier ordering. For example, this migration may start when a given tier is at greater than a specified percentage capacity (e.g., more than 90% full), or when the data on that tier is more than X days old and usage has exceeded a minimum threshold percentage.

vDisks are virtual disks that are exported to user VMs by the Service VMs. A vDisk is a software abstraction that manages an address space of S bytes where S is the size of the block device. Each service VM might export multiple vDisks. A user VM might access several vDisks. Typically, all the vDisks exported by a service VM are accessed only by the user VMs running on that server node. A vDisk is assigned a unique container at creation time. The data in the vDisk is thus managed according to the configuration parameters set on the container. Some additional configuration parameters are specified on the vDisk itself, including some or all of the following:

1. De-duplication: This specifies whether de-duplication is to be used for this vDisk. However, when de-duplication is used is determined by the data contraction policy.
2. Data contraction policy: The data contraction policy controls when de-duplication, compression, and Reed-Solomon encoding is applied (if any of them are specified). De-duplication and compression may be applied in-line to a primary storage path or out-of-line. If out-of-line, the data contraction policy specifies the time when deduplication/compression are applied (e.g., X days). Reed-Solomon encoding should be applied offline. The data contraction policy may specify a different time for doing Reed-Solomon than for deduplication/compression. Note that if both deduplication and compression are specified, then data would be de-duplicated and compressed at the same time before writing to disk.
3. Min total reserved capacity: This is the minimum reserved capacity for this vDisk across all the storage tiers. The sum of all minimum total reserved capacity parameters for the vDisks in a container should be less than or equal to the minimum total reserved capacity set on the container.
4. vDisk block size: The vDisk address space is discretized into equal sized blocks. Information about each block is stored, and a the configuration parameter determines the size of this block. It should be less than or equal to the stripe width parameter on the container. A relatively large vDisk block size (e.g., 128 KB) helps reduce the metadata that is maintained.
5. vDisk row blocks: The metadata of a vDisk is conceptually divided into rows. Each row is hash-partitioned onto one metadata server residing in some Service VM in this distributed system. This parameter controls how many blocks of this vDisk are in one row.
6. vDisk Capacity: This is the size (in bytes) of the vDisk address space. This effectively controls the size of disk that an external user VM sees.
7. QoS parameters: Each vDisk may specify a priority and a fair share. Competing JO requests from various vDisks shall be scheduled based on this priority and fair share.

As noted above, embodiments of the invention can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments of the invention, the basic unit of de-duplication is the extent, which is a contiguous portion of storage on a given storage device. Multiple extents can be collected together and stored within an "extent group."

Metadata is maintained by the set of Service VMs to track and handle the data and storage objects in the system. Each vDisk corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. The Metadata is used to track and maintain the contents of the vDisks and vDisk blocks.

Figure 3:
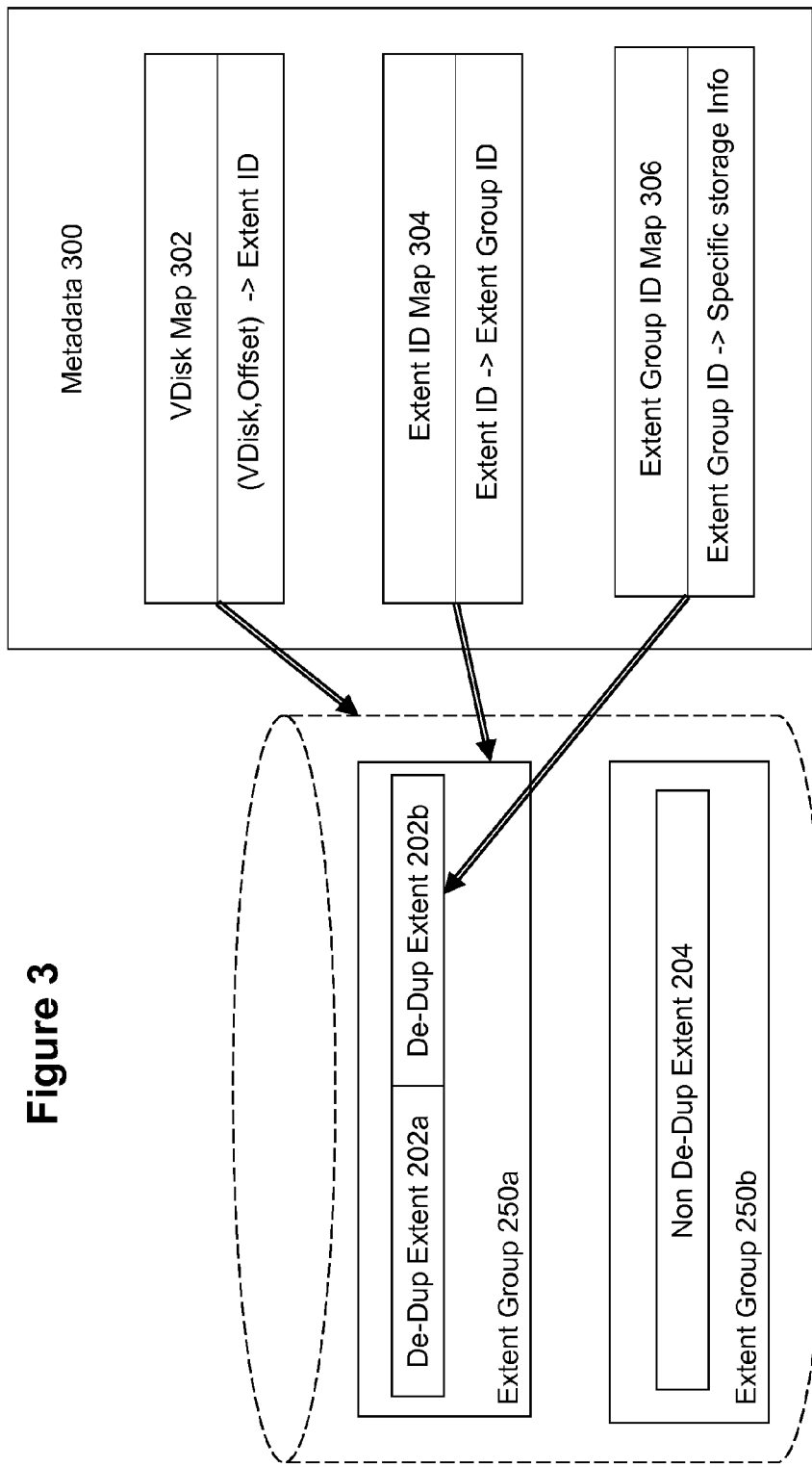
FIG. 3 illustrates metadata for implementing I/O and storage device management in a virtualization environment according to some embodiments of the invention.

As illustrated in FIG. 3, embodiments of the invention maintain three mapping structures as the metadata 300 to track the stored data. A first metadata structure (vDisk map 302) is used to map the vDisk address space for the stored extents. Given a specified vDisk and offset, the vDisk map 302 can be used to identify a corresponding extent ID. A second metadata structure (extent ID map 304) is used to map extent IDs. Given a specified extent ID, the extent ID map 304 can be used to identify a corresponding extent group. A third metadata structure (extent group ID map 306) is used to map specific storage information for extent group IDs. Given a specified extent group ID, the extent group ID map 306 can be used to identify corresponding information, such as for example, (1) disk identifier for the extent group, (2) list of extent IDs in that extent group, (3) information about the extents such as ref_counts, checksums, and offset locations.

The vDisk map expects the I/O request to identify a specific vDisk and an offset within that vDisk. In the present embodiment, the unit of storage is the block, whereas the unit of deduplication is the extent. Therefore, the vDisk map is basically assuming the unit of storage specified by the offset information is to a block, and then identifying the corresponding extent ID from that block, where the extent offset can be derived for within the block.

The discretization into vDisk blocks helps store this information in a table in the vDisk map. Thus, given any random offset within the vDisk, one can discretize it obtain the corresponding vDisk block boundary. A lookup can be performed in the vDisk map for that (vDisk, vDisk block) combination. The information in each vDisk block is stored as a separate column in the table. A collection of vDisk blocks might be chosen to be stored in a single row—this guarantees atomic updates to that portion of the table. A table can be maintained for the address space of each vDisk. Each row of this table contains the metadata for a number of vDisk blocks. Each column corresponds to one vDisk block. The contents of the column contain a number of extent IDs and the offset at which they start in the vDisk block.

As noted above, a collection of extents is put together into an extent group, which is stored as a file on the physical disks. Within the extent group, the data of each of the extents is placed contiguously along with the data's checksums (e.g., for integrity checks). Each extent group is assigned a unique ID (e.g., 8 byte ID) that is unique to a container. This id is referred to as the extent group ID.

The extent ID map essentially maps an extent to the extent group that it is contained in. The extent ID map forms a separate table within the metadata—one for each container. The name of the table contains the id of the container itself. The lookup key of this table is the canonical representation of an extent ID. In some embodiments, this is either a 16 byte combination containing (vDiskID, Offset) for non-deduplicated extents, or a 24 byte representation containing (extent size, SHA1 hash) for deduplicated extents. The corresponding row in the table just contains one column—this column contains the extent Group ID where the corresponding extent is contained.

When updates are made to a vDisk address space, the existing extent there is replaced by another (in case of de-duplication and/or for certain types of copy on write operations for snapshots). Thus the old extent may get orphaned (when it is no longer referred to by any other vDisk in that container). Such extents will ultimately be garbage collected. However, one possible approach is to aggressively reclaim disk space that frees up. Thus, a "ref_count" value can be associated with each extent. When this ref_count drops to 0, then it can be certain that there are no other vDisks that refer this extent and therefore this extent can immediately be deleted. The ref_count on a de-duplicated extent may be greater than one when multiple vDisks refer to it. In addition, this may also occur when the same extent is referred to by different parts of the address space of the same vDisk. The ref_count on an extent is stored inside the metadata for the extent group in the extent Group ID map rather than in the extent ID map. This enables batch updates to be made to several extents and to allow updates to a single extent Group ID metadata entry. The ref_count on a non-deduplicated extent may be greater than one when multiple snapshots of a vDisk refer to that extent. One possible approach for implementing snapshots in conjunction with the present invention is described in co-pending U.S. Ser. No. 13/207,371, filed on even date herewith, which is incorporated by reference in its entirety.

To reduce the number of metadata lookups, an optimization can be made for the case of non-deduplicated extents that have a ref_count of one and are owned solely by the vDisk in question. In such a case, the extent ID map does not have an entry for such extents. Instead, the extent Group ID that they belong to is put in the vDisk address space map itself in the same entry where information about the corresponding vDisk block is put.

The extent Group ID map provides a mapping from an extent Group ID to the location of the replicas of that extent Group ID and also their current state. This map is maintained as a separate table per container, and is looked up with the extent Group ID as the key. The corresponding row in the table contains as many columns as the number of replicas. Each column is referenced by the unique global disk ID corresponding to the disk where that replica is placed. In some embodiments, disk IDs in the server/appliance are assigned once when the disks are prepared. After that, the disk ids are never changed. New or re-formatted disks are always given a new disk ID. The mapping from disk IDs to the servers where they reside is maintained in memory and is periodically refreshed.

An extra column can also be provided for the vDisk ID that created this extent group. This is used to enforce the property that only one vDisk ever writes to an extent group. Thus, there is never a race where multiple vDisks are trying to update the same extent group.

In some embodiments, for each replica, the following information is maintained:

a. The diskID where the replica resides.
b. A Version number.
c. A Latest Intent Sequence number. This is used for maintaining metadata consistency and is explained later in the subsequent sections.
d. The extent ids of each of the extents contained in the extent group. This is either the 8 byte offset for non-deduplicated extents, or 24 bytes (size, SHA1) for deduplicated extents. For each extent, the offset in the extent-GroupID file is also contained here. Additionally a 4 byte reference count is also stored for each extent. Finally, an overall checksum is stored for each extent. This checksum is written after a write finishes and is primarily used to verify the integrity of the extent group data.
e. Information about all the tentative updates outstanding on the replica. Each tentative update carries an Intent Sequence number. It also carries the tentative version that the replica will move to if the update succeeds.

If multiple replicas share the same information, then that information will not be duplicated across the replicas. This cuts down unnecessary metadata bloat in the common case when all the replicas are the same.

At any time, multiple components in the appliance may be accessing and modifying the same metadata. Moreover, multiple related pieces of the metadata might need to be modified together. While these needs can be addressed by using a centralized lock manager and transactions, there are significant performance reasons not to use these lock-based approaches. One reason is because this type of central locking negatively affects performance since all access to metadata would need to go through the centralized lock manager. In addition, the lock manager itself would need to be made fault tolerant, which significantly complicates the design and also hurts performance. Moreover, when a component that holds a lock dies, recovering that lock becomes non-trivial. One may use a timeout, but this results in unnecessary delays and also timing related races.

Therefore, the advanced metadata described above provides an approach that utilizes lock-free synchronization, coupled with careful sequencing of operations to maintain the consistency of the metadata. The main idea is that the order in which the metadata of FIG. 3 is accessed will differ between operations that do not change the metadata (e.g., read operations) and operations that will result in a change to the metadata (e.g., write operations).

With regard to the three metadata maps 302, 304, and 306 shown in FIG. 3, read operations should always proceed in a top-down direction starting with vDisk map 302, then extent ID map 304, followed by extent group ID map 306. In contrast, write operations will proceed in the bottom-up direction starting with the extent group ID map 306, followed by the extent ID map 304, and then subsequently followed by the vDisk map 302.

The reason this works is because any dangling or inconsistent references caused by a failure of the write operations in the bottom-up direction should not result in any detectable inconsistencies for the read operations that work in the top-down direction. This is because each layer of the metadata builds upon each other so that in the top-down direction, an extent ID identified from the vDisk map 302 should have a corresponding entry in the next level extent ID map 304, which in turn is used to identify an extent group ID which itself should have a corresponding entry in the extent group ID map 306.

To explain, consider first the opposite situation in which an update/write operation to the metadata is made in same direction as the read operations (i.e., in the top-down direction). Assume that the write operation successively creates an extent ID entry in the vDisk map 302, but dies before it is able to complete the operation and therefore never has the opportunity to create an entry in the extent ID map 304 that maps the extent ID to an extent group ID. In this situation, a subsequent read operation may possibly read that extent ID from the vDisk map 302, but will encounter a dangling/inconsistent reference because that extent ID does not map to anything in the extent ID map 304.

Now, consider if the update/write operation to the metadata is made in the bottom-up direction. Assume that the write operation successively creates a mapping between the extent ID and an extent group ID in the extent ID map 304. Further assume that the operation dies before it is able to finish, and therefore never has the opportunity to create an entry in the vDisk map 302 for the extent ID. This situation also creates a dangling reference in the extent ID map 304. However, unlike the previous scenario, a subsequent read operation will never reach the dangling reference in the extent ID map 304 because it has to first access the vDisk map 302, and since the previous operation did not reach this map, there is no reference to the new extent ID in the vDisk map 302. Therefore, the subsequent read should not be able to find a path to reach the dangling reference in the extent ID map.

In this way, the present approach inherently maintains the integrity of the metadata without needing to provide any central locking schemes for that metadata.

It is possible that crashes may occur during the write or update process, so that extraneous data exists somewhere within the metadata. For example, it is possible that a crash occurs after metadata is written to the extent group ID map, but prior to the corresponding data being written to the extent ID map or vdisk map. In this situation, there may be dangling reference data in the lower level maps which do not have equivalent references in the upper level maps. An example would be a reference count in the extent group ID map which is larger than the actual number of references to a given extent. However, because of the top-down nature of data access, the excess or dangling data should not result in fatal inconsistencies.

The present invention is directed to a mechanism to maintain the health and integrity of the storage system, which is referred to herein as the "curator". One task performed by the curator, as an example among many possible tasks, is to efficiently perform a garbage collection process to clean up excess or dangling data within the metadata.

Figure 4:
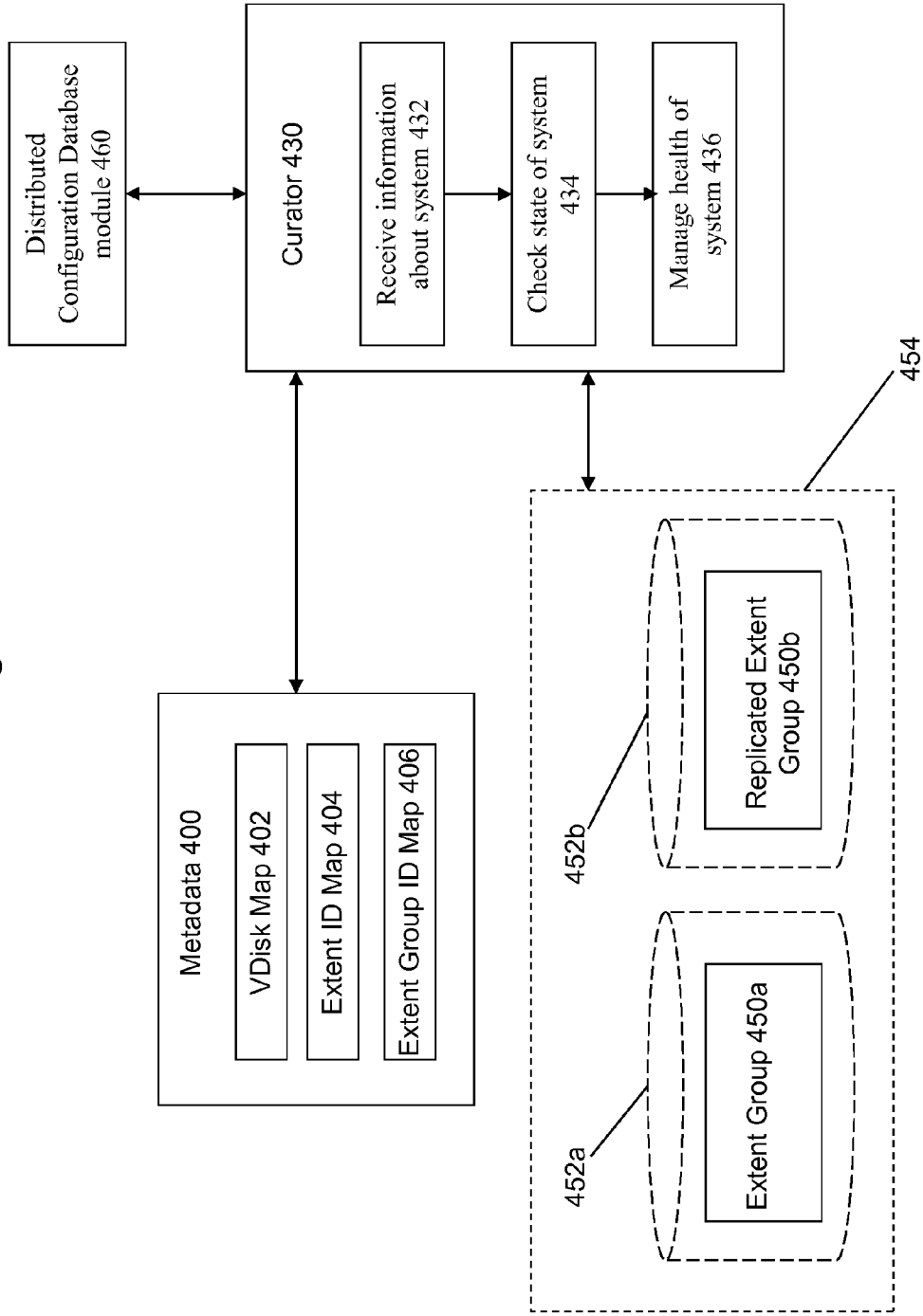
FIG. 4 shows a curator entity in a storage system according to some embodiments of the invention.

FIG. 4 shows an example architecture for using a curator 430 to manage a storage system according to some embodiments of the invention. The curator receives information about the configuration and general health of the system 432. In some embodiments, a system module (hereinafter referred to as a "Distributed Configuration Database" module) is utilized to track the configuration and health of nodes and components in the storage system. Either at a periodic basis, or upon certain triggering event, such information is provided from the Distributed Configuration Database module 460 to the curator 430.

The curator 430 then performs operations 434 to check the state of the system. For example, with respect to the state of the metadata 400, this checking process involves scanning of the metadata 400 using either a full scan or a partial scan. A full scan would involve scanning of all three maps (Vdisk map 402, extent ID map 404, and extent group ID map 406). A partial scan involves a scan of a subset of these maps, e.g., a scan of only the extent group ID map 406. A full scan consumes far more computing resources as compared to a partial scan. Therefore, in some embodiments, the partial scan may be scheduled more frequently than a full scan.

Certain valuable tasks can be taken to manage the health of the system 436 even with just a partial scan. For example, a partial scan can be performed on just the extent group ID map 406 to help identify situations in which replication can be optimized for the storage system. One such situation is when replication is supposed to exist to replicate an extent group so that it s stored on multiple storage locations. FIG. 4 shows an example extent group 450a on a storage device 452a that is also replicated as extent group 450b on another storage device 452b. Based on information received from the Distributed Configuration Database module 460, the curator may discover that replication has failed, e.g., because storage device 452b has crashed. In this situation, curator may use a partial scan to discover this situation, and to correct the problem by making sure that the extent group 450a becomes replicated to another storage device.

In addition, even in the absence of a crash, curator may be used to perform a partial scan to optimize replicated storage of an extent group. For example, the curator may discover that the extent group 450a is not locally stored at the node to which it is controlled or owned by a given component in the system. The curator can discover this using a partial scan of the extent group ID map 406 and optimize this situation by creating a local replica of the extent group 450a at the node which controls this extent group.

A full scan is performed if the maintenance or optimization tasks involve gathering information from all three map tables in the metadata 400. For example, consider garbage collection tasks that can only be taken by comparing the data in all map tables in metadata 400. Such tasks can only be taken if a full scan is performed of the three tables.

The curator 430 can be configured to perform any necessary maintenance or optimization tasks in the storage system.

The following section provides an example list of tasks that may be performed in some embodiments of the invention. Any suitable combination of these tasks may be implemented or even combinations that include other and additional tasks.

A first example task is to check the consistency of the metadata mappings in metadata 400. For example, the curator 430 checks that for every extent ID referred to in the vDisk block map, there is an extent group that contains that extent ID.

Another possible task is to perform garbage collection for any orphaned metadata. For example, if an extent group ID mapping is not referred to by any extent ID mappings, this will be garbage collected. Garbage collecting of orphaned data (extent groups) can also be performed.

The curator 430 can also be use to fix the reference counts on the extent IDs stored in the metadata for an extent group in the extent Group ID map 406. In some embodiments, if the reference count needs to be fixed by the curator 430, then the reference count is normally fixed by being decreased and not by being increased.

Another possible task is to start replication for extent groups that are not adequately replicated. An example of this task is described above.

The curator 430 may also be used to check the consistency of the configuration information stored in external system components, such as the Distributed Configuration Database module 460.

Yet another possible task is to perform extent group migration. This type of migration may be performed for any number of reasons, e.g., for ILM reasons. In addition, such migration may be instituted because of imbalanced disks or to co-locate one replica of the data for a vDisk on the same server as the one that currently hosts that vDisk.

The curator 430 may operate to resolve any tentative updates to extent groups that have pending for a time period. As described in related application Ser. No. 13/207,357, tentative updates may be specified to provide information that is accessible by the other operations, e.g., within a set of common state if both operations are running within the same service VM.

Another possible curator operation is to handle data degradation. For example, extents might be found which are close in vDisk address space but are spread out in multiple extent groups. Such extent groups can be merged if possible.

Another task is to copy vDisk block maps in the background from parent vDisks to child vDisks for snapshots.

The curator may operate to remove vDisks from the Distributed Configuration Database module if the vDisk is a parent vDisk from a snapshot, all child vDisks from the snapshot already have the parent's full vDisk block map copied, and no other vDisks refer to the extents pointed to by the parent's vDisk block map.

Lazy data transformation can also be performed by the curator, where vDisks are configured to perform compression/deduplication lazily once the data is older than a specified threshold.

Another task is to check for missing extent groups on disk and starting replication if needed. While the integrity of each extent group can be checked on disk by examining files and checking against the corresponding data from the metadata, it should also check for extent groups that are missing on disk (e.g., deleted as a result of human or software error).

The curator may also operate to maintain extents and reference counts. Over time, as extents have reference counts of 0, there may be situations where a given extent group has many extents with reference count of 0 and where few extents that are being used. The latter extents should be consolidated and written to new extent groups and the old extent groups should be deleted. Note that reference counts only go down to 0 for deduplicated extents or for non-deduplicated extents whose vDisks have been deleted.

For all non-deduplicated extents that have entries in the extentIDMap, the curator can operate to remove any lingering (e.g., stale) extent group ID references in vDisk block map entries that point to those extents. Once a non-deduplicated extent has an entry in the extent ID Map, this implies that the extent group ID optimization no longer is valid and the full vDisk block map→extent ID map→extent group ID map needs to be taken.

The curator can also operate to update the Curator's in-memory logical timestamps in the vector clock for nodes or instances that are dead, but not removed from the configuration.

Yet another possible task is to fix any entries in the extent Group ID Map that include references to replicas on non-existent disks. It is possible that an admin may have removed a node (or a specific disk) from the system. When that happens, all extent groups that were previously stored on the disks on that node will have dangling references to replicas on disks that no longer exist. These dangling references can be fixed by the curator.

Figure 5:
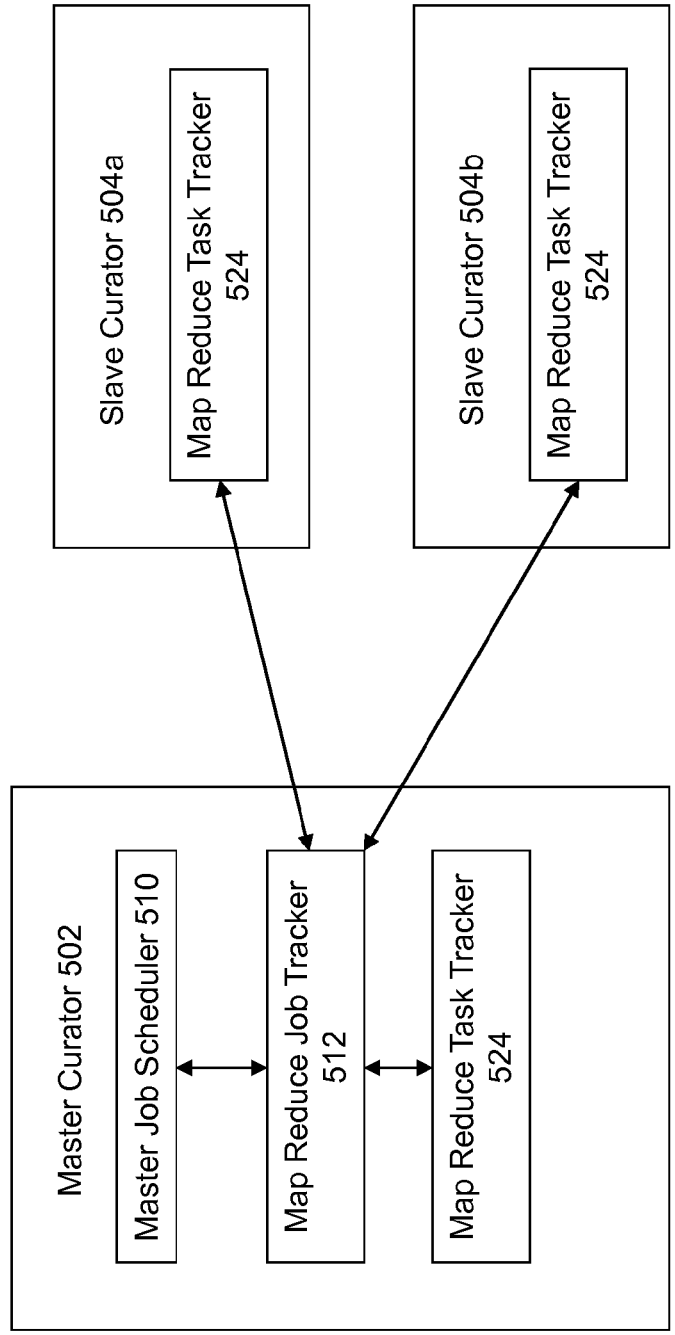
FIG. 5 illustrates master and slave curators according to some embodiments of the invention.

The curator tasks can be run in parallel on multiple nodes of the storage system. To parallelize the activities of the Curator, each node of the cluster will run a Curator process. As shown in FIG. 5, one node will be elected as the master curator 502 and will coordinate execution of curator tasks on all nodes, including slave nodes 504a and 504b. An election process can be used to establish which of the nodes is the master node. Because the master can crash and change at any given time, all nodes could potentially have stale information for a period of time during a master switch. Moreover, nodes may be executing tasks on behalf of an old master when a new master takes over. The Curator has to take both these cases into account.

Each node in the cluster keeps track of who it currently thinks the current master is. If a request arrives carrying a different IP address, the receiving node performs a lookup in the Distributed Configuration Database module to fetch the latest master information. If the information still does not match after the Distributed Configuration Database module lookup, the request is rejected. If the information does match, the node starts to process the request. The first request issued by a new master to each node is always a request to cancel all currently executing tasks (tasks that may be lingering from any previous incarnations of the master). This ensures that once a new master is elected and a given node receives its first request from this master, all previous requests being processed from previous masters are either finished or canceled.

Periodically, the master will coordinate the execution of all tasks the curator needs to perform. A master job scheduler 510 is used to identify the tasks that need to be performed. The job scheduler 510 can be configured to run on a schedule so that tasks are performed on a periodic basis. In addition, the job scheduler 510 can be configured to execute tasks in reaction to specified events.

According to some embodiments of the invention, a MapReduce approach is taken to distribute workloads among the parallel curator nodes. MapReduce is a framework that can be employed to process large workloads among a plurality of concurrent work entities. In general, map reduction operates by breaking the workload into different portions for separate processing, and then to utilize a shuffle phase to consolidate and process the processing results.

Map reduce functions typically involve a "map" step that takes an input set of data, divides the input into smaller portions, and distributes the divided portions among a group of slave or worker nodes for processing. The output of the map tasks feed directly into the "reduce" tasks (this is the shuffle referred to earlier in this document). More specifically, each map task produces output data that is partitioned into sets and each set feeds into a distinct reduce task. Thus, if there are m map tasks and r reduce tasks in a given set of MapReduce job(s), each of the m map tasks produces output for each of the r reduce tasks and each of the r reduce tasks processes input from each of the m map tasks.

In many cases, both the map and reduce steps are performed relative to key-value pairs of data, where the map step takes data from a first domain to a second domain. This can be performed in parallel using multiple curator nodes. The resultant list of modified key-value pairs are then grouped together for further processing. The reduce step can also be applied in parallel to produce a collection or list of data ((key, list(value))→list(key, value)).

In some embodiments of the present invention, map reduction processing is employed to perform the full and partial scans on the system metadata. This allows the workload to be partitioned into different portions that can be concurrently operated upon by the different curator nodes in the system.

Therefore, the job of the master job scheduler 510 is to identify the set of tasks that needs to be performed. The map reduce job tracker 512 in the master curator 502 takes the list of tasks, and divides up that work among the different curator nodes in the system. In particular, the map reduce job tracker 512 in the master curator 502 will attempt to parallelize work across all healthy nodes in the cluster, by using information from the Distributed Configuration Database module to identify the IP addresses of these healthy nodes. It is noted that over time, the set of healthy nodes in the system can change. Moreover, a node that was previously healthy and is now viewed as unhealthy may still be in the middle of perhaps some work (e.g., a reduce task from an old master).

The master curator 502 will use RPCs (remote procedure calls) to send instructions to the different curator nodes to perform the workload. RPCs are sent to the different curator nodes in the cluster (including itself) to perform specific actions (e.g., running a map or reduce task assigned to it by the master). This is implemented by having the map reduce job tracker 512 in the master curator 502 send instructions to the map reduce task tracker 524 in each curator node. The map reduce task tracker is the entity on each curator node that is responsible for executing the specific work that has been assigned to that respective curator node 502, 504*a*, and/or 504*b*.

Figure 6:
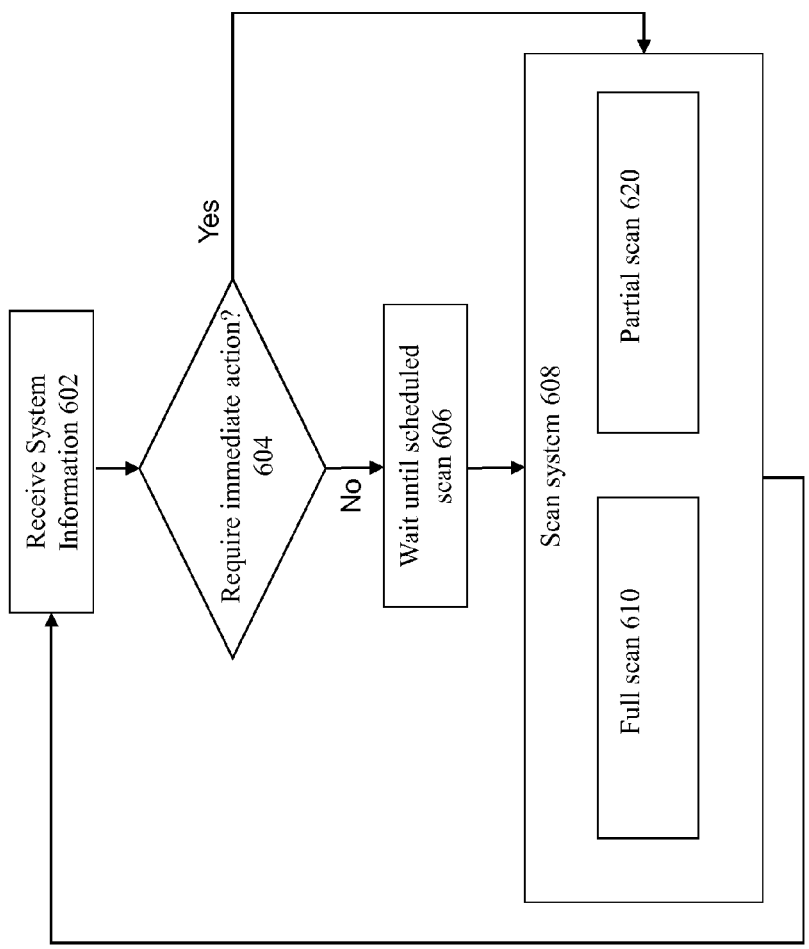
FIG. 6 shows a flowchart of an approach for implementing a curator according to some embodiments of the invention.

FIG. 6 shows a flowchart of an approach for implementing curator processing according to an embodiment of the invention. At 602, system information is received by the master job scheduler of the master curator. The system information comprises state information regarding the health and existence of nodes and components in the system. As described in more detail below, the received information also includes vector clock information.

At 604, a determination is made whether immediate action is required. As previously noted, the curator normally operates in a periodic manner. Therefore, in the normal situation, the master curator will wait at 606 until a scheduled scan before it processes tasks. However, certain circumstances may trigger the master curator to immediately begin its processing, e.g., upon detection of a node failure. Therefore, under recognition of these circumstances, the process will immediately proceed to scan the system at 608.

At 608, the map reduce job tracker will assign work to each curator node to perform the required scanning activities. In general, either a full scan or a partial scan may be performed. In either case, the map reduce job tracker will assign work to the map reduce task tracker in each curator node to perform the work.

When all of the tasks are complete, the master curator will wait for some period and then repeat the process. Note that while a single period for all tasks is mentioned here, this does not preclude the possibility that some subsets of tasks can also be run with smaller periods. For example, replicating extent groups that are under replicated can be done by just performing the map phase of MR3 (described in more detail below) and thus can potentially be done more frequently.

Figure 7B:
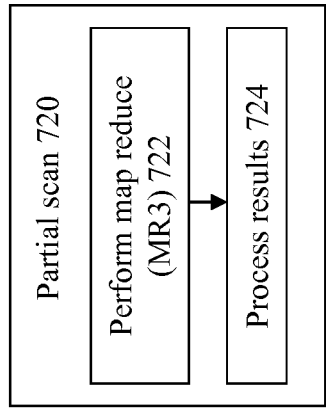
FIGS. 7A-C show example approaches for implementing full and partial scans according to some embodiments of the invention.
Figure 7A:
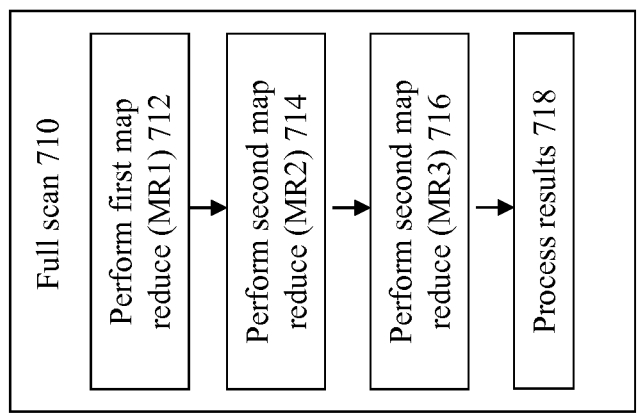

FIG. 7A shows a flowchart of an approach to perform a full scan 710. The first action 712 is to perform a first map reduce step (MR1). The first map reduce step MR1 of 712 is then followed by a second map reduce step (MR2) of 714, which is followed by the third map reduce step (MR3) of 716. In some embodiments, the first map reduce step MR1 is employed to map the data in the vdisk map, the second map reduce step MR2 is employed to map the extent ID map tables, and the third map reduce step MR3 is used to map the data in the extent group ID map table. The results of the MR1, MR2, and MR3 steps are then used to clean up and optimize the system at 718.

FIG. 7B shows a flowchart of an approach to perform a partial scan 720. Unlike the full scan of FIG. 7A, the partial scan of FIG. 7B only performs one map reduce, e.g., MR3. Therefore, at 722, the single map reduce is performed. The results of the map reduce step are then used to clean up and optimize the system at 724.

Figure 7C:
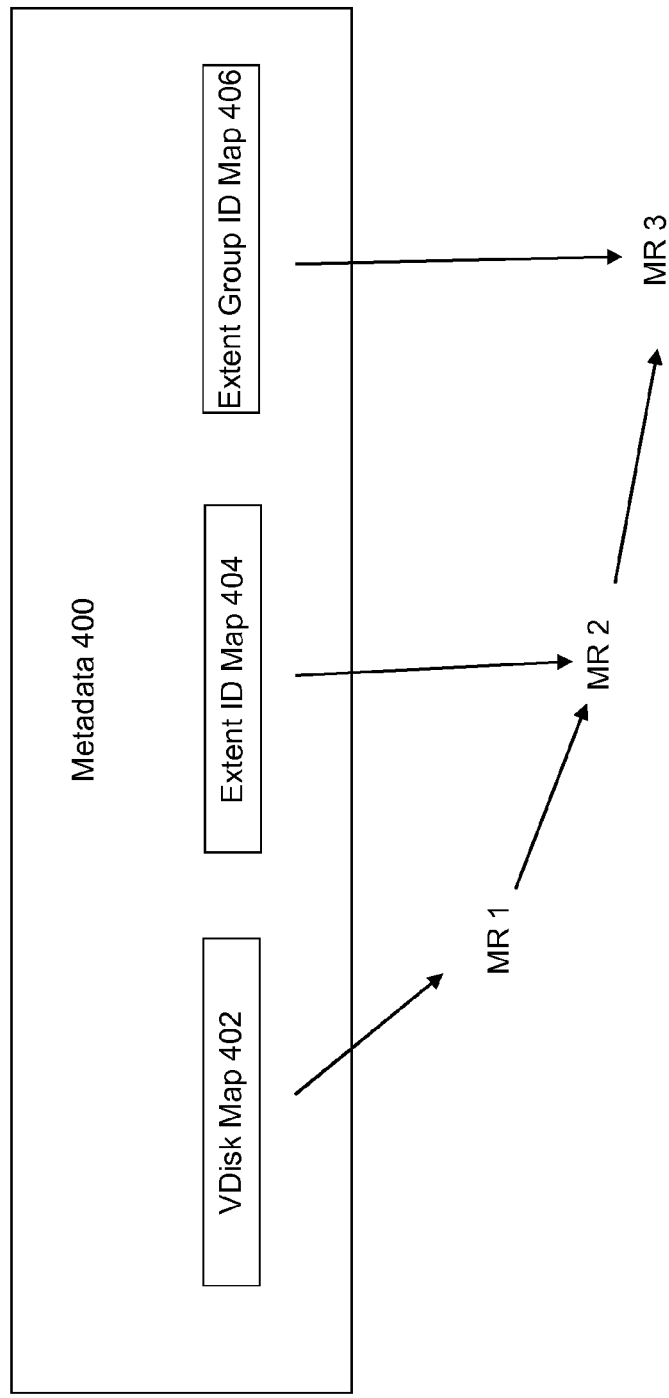

FIG. 7C generally illustrates how MR1, MR2, and MR3 relate to the different metadata tables according to some embodiments of the invention. In particular, MR1 performs map reduction upon the vdisk map table. The results of MR1 is stored in a known location, e.g., on a specified disk location. MR2 is then performed using the results of MR1 and the contents of the extent ID map table. MR3 follows by using the results of MR2 and the contents of the extent group ID map table. Each of the MR1, MR2, and MR3 actions are described in more detail below.

The first MapReduce MR1 performs map tasks to read from the vDisk block map for all vDisks. This MapReduce job MR1 contains both map and reduce phases. For the map phase, the curator reads entire tables of the metadata. The mapping for MR1 is as follows:

Map 1 (MR1.Map1, vDisk block map table)

The input for this mapping is the range of vDisk block map table rows for specific vDisk in a given container C. They are sorted sets of data, e.g., that are held for subsequent access. In the first map for MR1, each map task reads a range of vDisk block map table rows for specific vDisk in container C. For each vDisk block map entry, it emits key/val pairs for each extent where the keys are either non-deduplicated extent IDs or deduplicated extent IDs.

MR1 generates the following kinds of outputs:
1. MR1.Map.FileType1—List of <non dedup extent id, vdisk id, block number>tuples
2. MR1.Map.FileType2—List of <non dedup extent id, extent group id>pairs
3. MR1.Map.FileType3—List of <dedup extent id, vdisk id, block number>tuples In the reduce phase, each reduce task aims to identify inconsistencies and fix metadata problems. Example metadata problems fixed by the MR1, MR2, and MR3 phases include removing orphaned metadata entries in the extentID-Map and fixing vDisk block map entries that may need removal of extent group ID references. The reduce task may also output files that are used in a subsequent MapReduce step.

Output partitioning may occur in some embodiments, e.g., for files for non-deduplicated extents, the output is partitioned based on ranges of block numbers for non-deduplicated extent IDs (e.g., first 64 blocks to reduce task 0, second 64 blocks to reduce task 1, . . . , Rth 64 blocks to reduce task R−1, R+1th 64 blocks to reduce task 0, etc.). For files for deduplicated extents, output is partitioned mod R on the deduplicated extent ID's SHA-1 hash. Bandwidth optimizations can be implemented, so that for MR1.Map1.FileType1 files, one could output two different types of files. In the common case, it's likely that (vDisk ID, block number) is the same as the non-deduplicated extent ID. In those cases, there is only the need for the non-deduplicated extent ID. For MR1.Map1.FileType3 files, one could omit the vDisk ID when creating the files and sending them over the network. Only when they are merged with files for other vDisks in the container would the curator add the vDisk ID back again.

The second MapReduce MR2 is performed to process the extent ID map table. The map for MR2 can be as follows:

(MR2.Map2, extentIDMap table)

The input for this map phase can be the range of extentID-Map table rows for a given container C. The metadata from extent id map is scanned in this MapReduce job, and is used to generate two kinds of outputs:

1. MR2.Map.FileType1—List of <dedup extent id, extent group id>pairs

2. MR2.Map.FileType2—List of <non dedup extent id, extent group id>pairs

The reduce phase for MR2 is configured to emit an extra vdisk id for dedup extents (along with true-refcount). This phase takes MR1 and MR2 outputs (MR1.Map.FileType{1, 2,3} and MR2.Map.FileType{1,2}) as input and calculates true reference counts for all the extents. It emits two output files that are suitable for next MapReduce job, MR3. Therefore, the inputs for MR2.Reduce are:

1. MR1.Map.FileType1—List of <non dedup extent id, vdisk id, block number>tuples 2. MR1.Map.FileType2—List of <non dedup extent id, extent group id>pairs 3. MR2.Map.FileType2—List of <non dedup extent id, extent group id>pairs 4. MR1.Map.FileType3—List of <dedup extent id, vdisk id, block number>tuples 5. MR2.Map.FileType1—List of <dedup extent id, extent group id>pairs The two outputs from MR.Reduce are:

1. MR2.Reduce.FileType1—List of <extent group id, non dedup extent id, true-refcount>tuples 2. MR2.Reduce.FileType2—List of <extent group id, dedup extent id, true-refcount, candidate vdisk id>tuples The extra candidate vdisk id field for each dedup extent is used for migrating dedup extents out of extent groups owned by any vdisks marked for removal. These dedup extents should be shared by one or more active vdisks that are not marked for removal, and candidate vdisk id should be one of those vdisks. Multiple dedup extents from an extent group could be migrated into a new extent group, and one of their candidate vdisks is chosen as the owner for the new extent group.

In the third MapReduce MR3, metadata from extent group id map is scanned in this MapReduce job. Its map phase generates four kinds of outputs:

1. MR3.Map.FileType1—List of <extent group id, non dedup extent id, refcount>tuples 2. MR3.Map.FileType2—List of <extent group id, dedup extent id, refcount>tuples 3. MR3.Map.FileType3—List of <disk id, extent group id>pairs 4. MR3.Map.FileType4—List of <extent id, owner vdisk id>pairs The fourth output is used for supporting vdisk removal. In MR3's reduce phase, MR3.Map.FileType4, MR2.Reduce.FileType2 files are used to decide a new owner vdisk id (out of candidate vdisk ids from all dedup extents of an extent group.) MigrateExtent tasks are created for each extent group that is currently owned by vdisks marked for removal with the chosen new owner vdisk id.

In the cases discussed above, the files from certain MapReduce steps contain the true reference counts for the extents. One of the goals of this reduce is to fix any extent reference counts that need fixing. Each reduce task aims to identify inconsistencies and fix metadata problems. Specific metadata problems fixed here include removing orphaned metadata entries in the extentGroupIDMap and fixing extent reference counts.

For at least some of the MapReduce steps, the reduce task may need to read input files from each of the map tasks. Each of those input files may be sorted by the corresponding map tasks and optionally compressed. The master keeps track of the locations of all input files needed for each the reduce tasks in the reduce phase. Each time the master starts a reduce task on a node, it passes the locations of these files to the reduce task.

Intermediate files can be used with fixed-sized records to simplify sorting, memory management, and to avoid having to encode extra per-record information beyond the raw data (e.g., key/val lengths or record types). The reduce task operates over a small number of merged, sorted input files. A reduce task can process its input files by scanning over all input files analogous to the merge phase of a merge-sort.

If there is enough memory available to the reduce task, then reduce tasks do not have to write to disk in some embodiments. Instead, they can just fetch the input files over the network, sort all the data in memory, then operate over that data. If there is not enough memory to sort all the data in memory, an external merge-sort can be used. The reduce task will fetch all its input files and write them to disk. Then it will either merge and process the data from these files at the same time, or in the worst case, merge the files and write it all out to disk then process the data that way.

Given an estimate of the map input size, one can compute a reasonable estimate of the reduce input size. Suppose the reduce input size is estimated to be 100 GB. Clearly there will be a desire for multiple nodes processing this data in parallel. If there are n nodes in the system, one would want to have at least n reduce tasks and at least one reduce task running per node.

Flow control can be performed to appropriately manage the type of work that is performed in either the foreground or the background. The general idea is that certain types of tasks are very resource-intensive, and therefore should be scheduled for performance in a rate-limited manner as a "background" job onto the cluster. On the other hand, other types of work can and should be performed immediately as a "foreground" job. For example, suppose a node fails and that node previously stored 10 TB of extents. Assuming 64 MB extent groups, this implies that there will be a need to perform extent group replication for approximately 163,840 extent groups. It would be very resource intensive top replicate 163,840 extent groups at the same time, and therefore, this type of task should be scheduled as a background task.

Scheduling resource-intensive activities (such as extent group replication) are performed by the curator in conjunction with a background task scheduler within the master curator node. According to some embodiments, the following are examples tasks that are to be as background tasks in a rate-limited manner: (a) extent group replication (under-replicated extent groups); (b) extent group migration; (c) resolving tentative updates; (d) merge extent groups close in vDisk address space; (e) copy parent vDisk block map to children; (f) lazy data transformation; and (g) merge extent groups with mostly reference count 0 extents.

It is noted that most of the above tasks operate at the granularity of extent groups, and thus the amount of state needed to represent those pending tasks is not excessively large. For example, with 1 PB of total data and 64 MB extent groups, 128 MB is sufficient to represent all extent group IDs. This can easily be stored in memory on a single node.

To implement background tasks, task descriptions will be generated on the nodes and then collected on the master to be incrementally submitted to the background task scheduler. Each node will keep track of the high priority tasks it needs to perform in memory and also reserve some memory for low priority tasks. If a node fills up its low priority task buffer in memory, it'll spill over to a bounded amount of space on disk. If the limit on disk is also reached, any additional low priority tasks will get dropped. Each time the Curator runs, it keeps track of IDs of all containers and vDisks that it had dropped tasks for. The next time the Curator runs, it will process containers and vDisks that had dropped tasks first. This avoids starvation.

Each time the Curator runs, it generates tasks that are already pending execution from a previous run. Duplicate tasks are suppressed for high priority tasks by examining what's in memory and ignoring duplicates. To minimize the amount of memory used, this may require keeping logically distinct chunks of work in separate sorted data structures (e.g., arrays) and performing duplicate suppression based on logical chunks of work. For disk, there are multiple options. One option is to just always try to add tasks to disk without regard to duplicates. That does not affect correctness, only performance. Another option is to not use disk at all and just an in-memory buffer of high priority and low priority tasks and always suppress duplicates. Yet another option is to use disk but only write "logically complete" chunks of work. For example, in the 1 PB compression example, It is unlikely the system is composed of a single 1 PB vDisk. In this situation, one could start with just writing all the tasks to compress a few vDisks to disk (in separate files) for example. On a subsequent iteration of the Curator, if it wants to schedule compression tasks for the same vDisks, the Curator will already see that it has chunks of outstanding compression tasks (some subset of which might overlap) for those vDisks are already scheduled. It would thus skip adding more work for those vDisks until those existing chunks of work are finished.

According to some embodiments of the invention, vector clocks are used to make sure that a set of data is ripe for clean-up by the curator. The issue being addressed is that the curator is scanning the metadata in an effort to clean up excessive or incorrect data entries within the metadata tables. However, as discussed in related application Ser. No. 13/207, 357, the metadata is operated upon in a lock-free manner. Therefore, it is quite possible that the metadata being scanned by the curator is also being operated upon at that exact same time by another component that is writing or changing that data. Therefore, a mechanism is needed to ensure that the curator cleans up data that truly is incorrect (e.g., because of a crash), and not clean up data which merely appears to be incorrect because it is in the midst of being operated upon by another component.

To address this issue, a vector clock is associated with each entry in the metadata that is operated upon by an entity or component. The vector clock includes a vector of one or more logic timestamps for the entry. Whenever a modification or change is made an entry, the entry is associated with the logical timestamp in the vector clock.

The logical timestamp is associated with a known incarnation of the component that is operating upon the entries. When the curator starts its processing, part of the data received for it will include information about the current and/or past incarnations of the components in the system, particularly with respect to the last known incarnation value for completed work by the components.

When the curator operates, it will check whether the entry to be possibly cleaned is associated with a logical timestamp. If so, then the curator will check whether the logical timestamp is associated with an incarnation number that is known to be completed (e.g., crashed or finished processing). If so, then the curator is free to perform the clean up operation on that entry. If not, then this means that the incarnation value indicates that a component may be performing a current operation upon that entry as part of its processing. In this situation, the Curator will skip that entry for its clean up processing. Therefore, to determine whether an entity/component whose timestamp resides on a metadata entry is really done with the corresponding operation, one examines the vector clock. Each entity or component that might be updating the metadata has an entry in the vector clock that essentially says "I am done with all operations whose timestamp is less or equal to T". If the Curator sees a timestamp T' on a metadata entry from a given entity/component and wants to figure out whether that entity/component is really done with the operation on that metadata entry, it simply looks up the last published timestamp in the vector clock and compares T with T'.

The logical timestamp (which may also be referred to as a "logical operation clock", is a value that us specific to given component. "vector" clock because it is possible for multiple entities/components to be operating upon the same entry at the same time. Therefore, the entry may be associated with multiple logical clocks from multiple entities/components. Each logical operation clock consists of a (component id, incarnation id, operation id). A vector clock is a set of such logical operation clocks, one per component.

In some embodiments, the logical timestamp consists of the following tuple: (ComponentID, IncarnationID, OperationID). The Component ID is a unique identifier assigned to each component that can write to the metadata. For example, each control program (referred to herein as a "Core module"), and Curator would get its own Component ID. The IncarnationID for a component is a monotonically increasing number that is advanced every time that component restarts. This value can be associated with a real timestamp, but it can also be maintained through a global distributed service. The OperationID is a value that is monotonically increasing. It is internally generated by the component and is only maintained in memory.

For example, if there are three components in the system with component ids 3, 5, and 8, then a possible vector clock for these components (with the format (component id, incarnation id, operation id):

(3, 100, 343)←logical operation clock for Component 3
(5, 34, 512)←logical operation clock for component 5
(8, 341, 10040)←logical operation clock for Component 8

The collection of ((3, 100, 343), (5, 34, 512), (8, 341, 10040)) is the vector clock. While logical timestamps from two different components are not comparable, two logical timestamps with the same ComponentID can be compared to establish causality.

Every operation performed by a component is assigned to a new logical timestamp (by generating a new OperationID). Periodically, every component also writes to a central manager the largest logical timestamp corresponding to which all of its older operations have been completed. The collection of all the logical timestamps thus written to the Distributed Configuration Database module forms a vector clock of completed operations.

As an example, consider an operation in component A that needs to update rows X, Y and Z in the metadata. It will generate a new logical timestamp (by generating a new OperationID) and put that into one of these rows. In this fashion, the Curator would not accidentally consider an extentGroupID to be garbage when no mapping for it currently exists in the extentID map—if the corresponding row in the extentGroupID map has a logical timestamp that indicates that an operation is in progress.

Therefore, what has been described is an improved approach for implementing metadata to perform I/O management for storage devices in a virtualization architecture.

System Architecture

Figure 8:
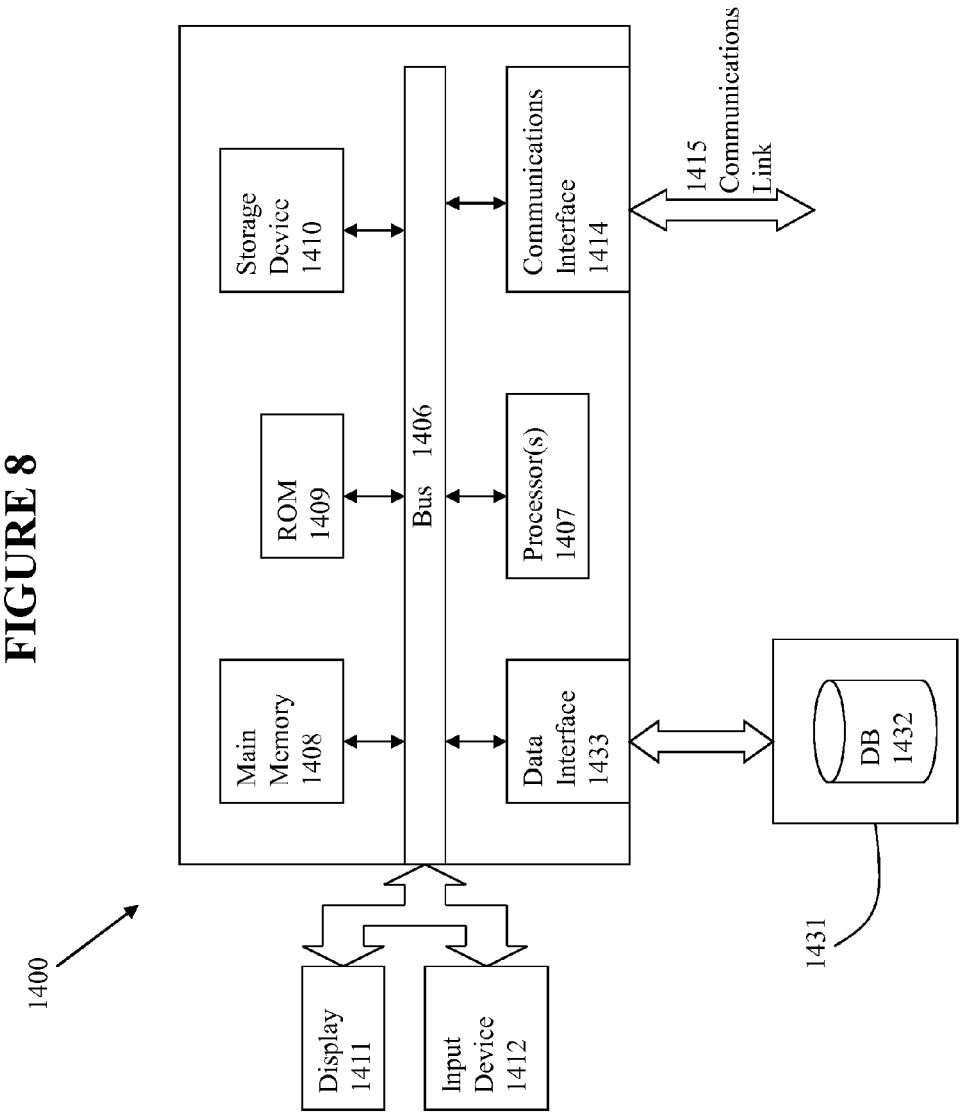
FIG. 8 is a block diagram of a computing system suitable for implementing an embodiment of the present invention.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for managing a virtual storage system implemented with a processor, comprising:
  receiving information regarding components in the virtual storage system;
  using multiple maintenance components to manage the components and metadata for the virtual storage system, in which the metadata relate to storage of data within the virtual storage system;
  checking the state of the virtual storage system by scanning the metadata, wherein a mapreduce operation comprising a first mapreduce and a second mapreduce is performed to check the state of the virtual storage system, wherein first mapreduce is directed to a vdisk map and an extent ID map and the second mapreduce is directed to an extent group ID map; and
  maintaining the state of the virtual storage system based at least in part in results of checking the state of the virtual storage system.

2. The method of claim 1 in which the act of checking the state of the virtual storage system comprises performing a full scan or a partial scan of the metadata.

3. The method of claim 2 in which the full scan comprises a scan of all metadata tables and the partial scan comprises a scan of a subset of the metadata tables.

4. The method of claim 1 in which the mapreduce operation distributes work among the multiple maintenance components.

5. The method of claim 1 in which maintenance tasks for maintaining the state of the virtual storage system comprise at least one of checking consistency of the metadata, garbage collection, fixing reference counts, replication optimization, consistency checks for external components, data migration, resolution of tentative updates, handling of data degradation, background copy tasks, data transformations, checking for missing data on storage devices, maintenance of extents, or timestamp maintenance.

6. The method of claim 1 in which the multiple maintenance components are operated in parallel.

7. The method of claim 1 in which the multiple maintenance components comprise a master and multiple slaves, in which the master coordinates maintenance workloads to be run by the slaves.

8. The method of claim 1 in which certain tasks are scheduled to run as background tasks.

9. The method of claim 8 in which the background tasks are resource-intensive tasks.

10. The method of claim 1 in which the maintenance components check a logical timestamp for an entry in the metadata before processing the entry, wherein the entry is not processed if the logical timestamp indicates a possibility that the entry is currently being operated upon by another component.

11. The method of claim 10 in which the logical timestamp is a vector clock that is capable of being associated with multiple logical timestamps for multiple components.

12. The method of claim 10 in which the logical timestamp comprises an incarnation value and a component identifier.

13. The method of claim 10 in which the logical timestamp comprises an operation identifier.

14. A computer program product embodied on a non-transitory computer-readable medium, the non-transitory computer-readable medium having stored thereon a sequence of instructions which, when executed by a processor causes the processor to execute a method for managing a virtual storage system, the method comprising:
receiving information regarding components in the virtual storage system;
using multiple maintenance components to manage the components and metadata for the virtual storage system, in which the metadata relate to storage of data within the virtual storage system;
checking the state of the virtual storage system by scanning the metadata, wherein a mapreduce operation comprising a first mapreduce and a second mapreduce is performed to check the state of the virtual storage system, wherein first mapreduce is directed to a vdisk map and an extent ID map and the second mapreduce is directed to an extent group ID map; and
maintaining the state of the virtual storage system based at least in part in results of checking the state of the virtual storage system.

15. The computer program product of claim 14 in which the act of checking the state of the virtual storage system comprises performing a full scan or a partial scan of the metadata.

16. The computer program product of claim 15 in which the full scan comprises a scan of all metadata tables and the partial scan comprises a scan of a subset of the metadata tables.

17. The computer program product of claim 14 in which the mapreduce operation distributes work among the multiple maintenance components.

18. The computer program product of claim 14 in which maintenance tasks for maintaining the state of the virtual storage system comprise at least one of checking consistency of the metadata, garbage collection, fixing reference counts, replication optimization, consistency checks for external components, data migration, resolution of tentative updates, handling of data degradation, background copy tasks, data transformations, checking for missing data on storage devices, maintenance of extents, or timestamp maintenance.

19. The computer program product of claim 14 in which the multiple maintenance components are operated in parallel.

20. The computer program product of claim 14 in which the multiple maintenance components comprise a master and multiple slaves, in which the master coordinates maintenance workloads to be run by the slaves.

21. The computer program product of claim 14 in which certain tasks are scheduled to run as background tasks.

22. The computer program product of claim 21 in which the background tasks are resource-intensive tasks.

23. The computer program product of claim 14 in which the maintenance components check a logical timestamp for an entry in the metadata before processing the entry, wherein the entry is not processed if the logical timestamp indicates a possibility that the entry is currently being operated upon by another component.

24. The computer program product of claim 23 in which the logical timestamp is a vector clock that is capable of being associated with multiple logical timestamps for multiple components.

25. The computer program product of claim 23 in which the logical timestamp comprises an incarnation value and a component identifier.

26. The computer program product of claim 23 in which the logical timestamp comprises an operation identifier.

27. A system for managing a virtual storage system, comprising:
a processor;
a memory for holding programmable code; and
wherein the programmable code includes instructions for receiving information regarding components in the virtual storage system, using multiple maintenance components to manage the components and metadata for the virtual storage system, in which the metadata relate to storage of data within the virtual storage system, checking the state of the virtual storage system by scanning the metadata, wherein a mapreduce operation comprising a first mapreduce and a second mapreduce is performed to check the state of the virtual storage system, wherein first mapreduce is directed to a vdisk map and an extent ID map and the second mapreduce is directed to an extent group ID map, and maintaining the state of the virtual storage system based at least in part in results of checking the state of the virtual storage system.

28. The system of claim 27 in which the state of the virtual storage system is checked by performing a full scan or a partial scan of the metadata.

29. The system of claim 28 in which the full scan comprises a scan of all metadata tables and the partial scan comprises a scan of a subset of the metadata tables.

30. The system of claim 27 in which the mapreduce operation distributes work among the multiple maintenance components.

31. The system of claim 27 in which maintenance tasks for maintaining the state of the virtual storage system comprise at least one of checking consistency of the metadata, garbage collection, fixing reference counts, replication optimization, consistency checks for external components, data migration, resolution of tentative updates, handling of data degradation, background copy tasks, data transformations, checking for missing data on storage devices, maintenance of extents, or timestamp maintenance.

32. The system of claim 27 in which the multiple maintenance components are operated in parallel.

33. The system of claim 27 in which the multiple maintenance components comprise a master and multiple slaves, in which the master coordinates maintenance workloads to be run by the slaves.

34. The system of claim 27 in which certain tasks are scheduled to run as background tasks.

35. The system of claim 34 in which the background tasks are resource-intensive tasks.

36. The system of claim 27 in which the maintenance components check a logical timestamp for an entry in the metadata before processing the entry, wherein the entry is not processed if the logical timestamp indicates a possibility that the entry is currently being operated upon by another component.

37. The system of claim 36 in which the logical timestamp is a vector clock that is capable of being associated with multiple logical timestamps for multiple components.

38. The system of claim 36 in which the logical timestamp comprises an incarnation value and a component identifier.

39. The system of claim 36 in which the logical timestamp comprises an operation identifier.

40. The system of claim 27 in which a master maintenance component comprises a master job scheduler for assigning workloads to performed on a scheduled or ad hoc basis.

41. The system of claim 40 in which the master maintenance component further comprises a map reduce job tracker for coordinating map reduce workloads across multiple slave maintenance components.

42. The system of claim 27 in which the multiple maintenance components comprise a map reduce job tracker for performing map reduce workloads.

43. The system of claim 27 in which remote procedure calls are performed to communicate workloads between the maintenance components.

\* \* \* \* \*

UNITED STATES PATENT AND TRADEMARK OFFICE
CERTIFICATE OF CORRECTION

| | | |
|---|---|---|
| PATENT NO. | : 8,549,518 B1 | Page 1 of 1 |
| APPLICATION NO. | : 13/207365 | |
| DATED | : October 1, 2013 | |
| INVENTOR(S) | : Mohit Aron et al. | |

It is certified that error appears in the above-identified patent and that said Letters Patent is hereby corrected as shown below:

On the Title Page, Item (54) and in the Specification, Col. 1, line 2 in the Title: replace "MAINTENANECE" with --MAINTENANCE--

Signed and Sealed this
Thirtieth Day of December, 2014

Michelle K. Lee
*Deputy Director of the United States Patent and Trademark Office*